Patented Nov. 11, 1930

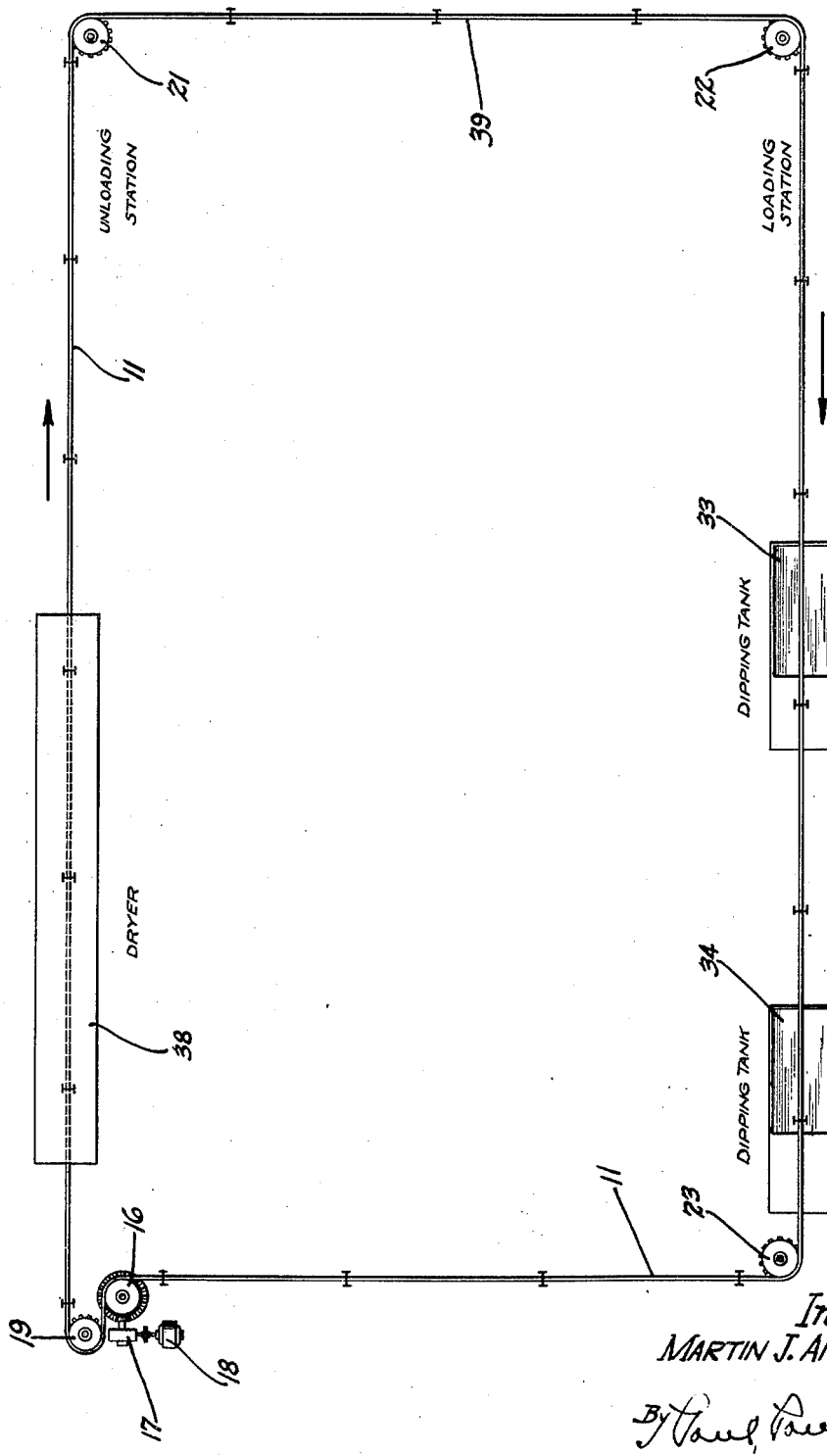

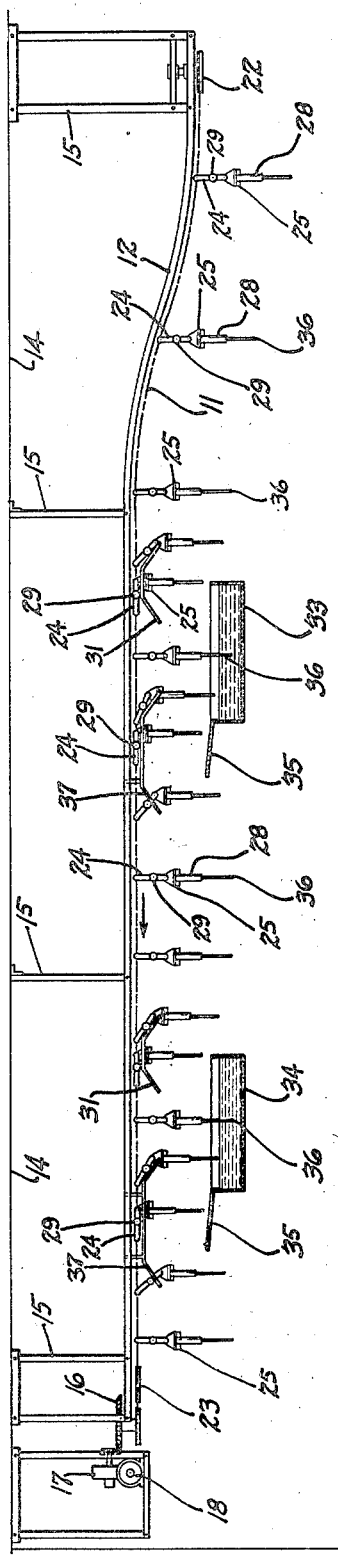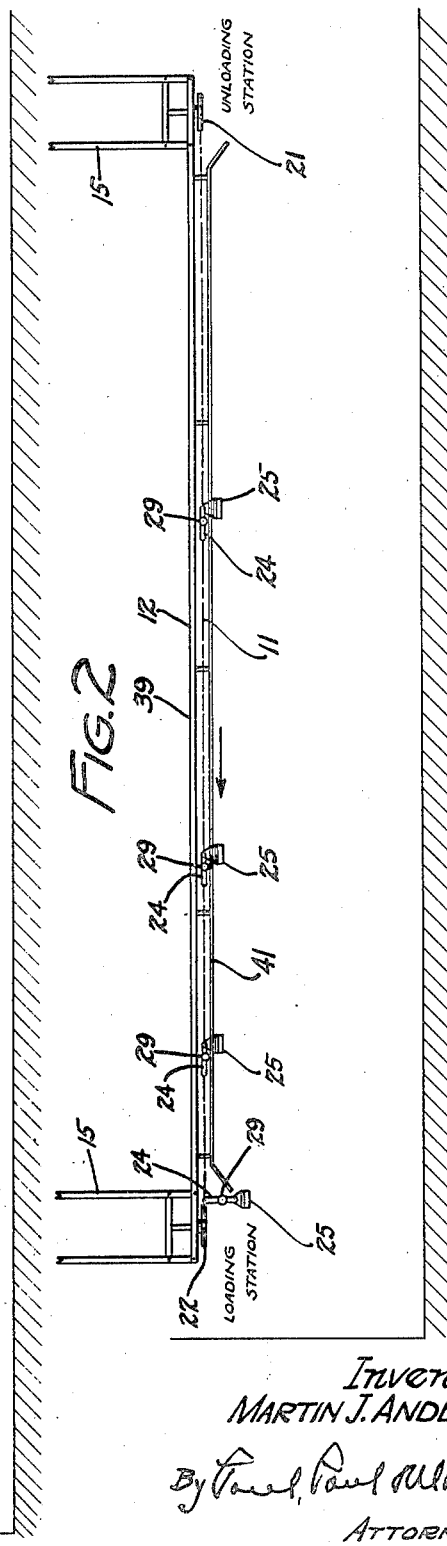

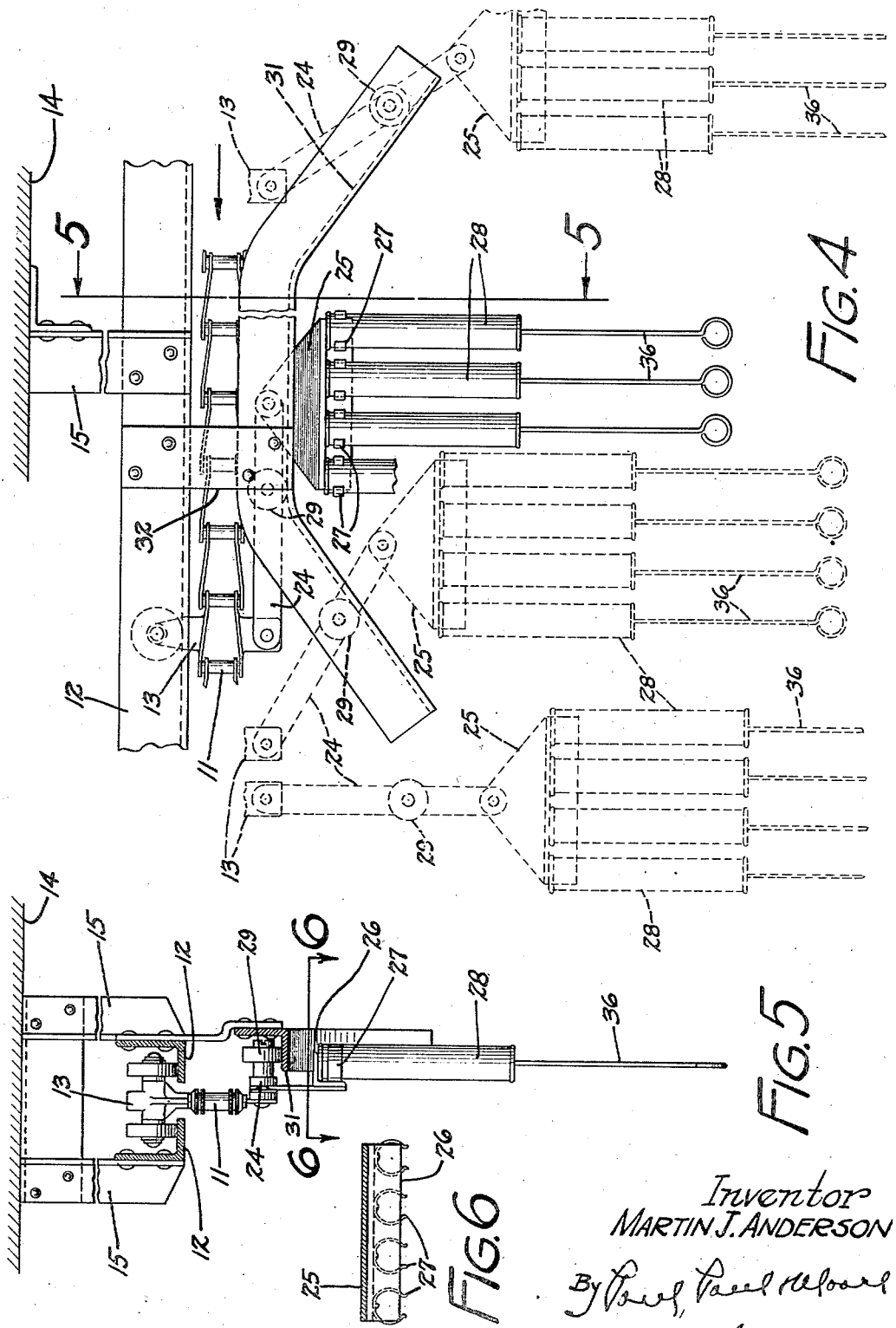

1,781,425

UNITED STATES PATENT OFFICE

MARTIN J. ANDERSON, OF ELLWOOD CITY, PENNSYLVANIA, ASSIGNOR TO MATHEWS CONVEYER COMPANY, OF ELLWOOD CITY, PENNSYLVANIA, A CORPORATION OF PENNSYLVANIA

CONVEYING APPARATUS FOR DIPPING

Application filed April 9, 1927. Serial No. 182,510.

This invention relates to improvements in conveying apparatus, generally, and more particularly relates to a conveying apparatus comprising a track, having a trolley mounted to travel thereon and the trolley having an article-carrying member connected therewith and normally depending therefrom, and means being provided beneath the track adapted to be engaged by said member to automatically raise and lower it at intervals during its travel.

An object of the invention is to provide such a conveying apparatus comprising an over head track arranged over a plurality of receptacles or tanks and having a trolley movable thereon, to which an article-carrying member is connected and adapted to be automatically raised and lowered at predetermined intervals along the track, so that articles carried thereby may be automatically lifted over the edges of the tanks and thereafter lowered to cause the depending portions of the articles to be submerged in a fluid such, for instance, as paint or lacquer, after which the articles will again be lifted out of the fluid and continue onward over the conveyer system.

A further object is to provide a conveyer system, comprising two dipping tanks arranged beneath the over-head track and spaced a suitable distance apart, the first tank being adapted to contain a suitable cleansing fluid, such as naphtha, and the second tank being adapted to contain a preserving or coating fluid such as paint or lacquer, and cam devices being arranged over the ends of each tank adapted to be engaged by traveling article-carrying members to cause the latter to automatically lift the articles over the walls of the tanks so that the lower portions thereof will first be submerged or dipped in a cleansing fluid and thoroughly cleaned, after which they will be dipped in a coating fluid such as paint or lacquer, and will thereafter continue onward over the conveyer system, passing through a drying apparatus wherein they are thoroughly dried so that they may be unloaded from the article-carrying members and packed for storage or shipment.

A further object is to provide a conveying apparatus comprising an over-head track having a plurality of trolleys mounted to travel thereon, all of which are operatively connected with an endless belt having a connection with a suitable source of power, and each trolley having an article-carrying member connected therewith, each provided with an anti-friction roller adapted to successively engage a plurality of cam elements, arranged at intervals beneath the track, to automatically elevate the members to provide ample clearance therebeneath during their travel over certain portions of the conveyer system.

The particular object of the invention, therefore, is to provide an improved apparatus particularly adapted for use to convey articles over a plurality of dipping tanks, and having means for automatically effecting the raising and lowering of the articles into and out of the dipping tanks, while in continuous movement, or to elevate them to provide suitable overhead clearance for persons passing therebeneath, the distance of travel in either suspended or lifted position and the height to which the load is raised being dependent upon the spacing between cams, the shape of the cams and the connection of the suspended arms with relation to the conveyer chains, and in the length of the arms and the location of the guide rollers thereon. The object of thus raising and lowering the loads is to permit of passing same in and out of dipping tanks; for lowering same into convenient operating positions; for obtaining lower levels for loading and unloading positions, while head room is maintained beyond these positions; and, for reducing vertical clearance when conveyer passes obstructions and for many similar purposes.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the accompanying drawings forming part of this specification;

Figure 1 is a diagrammatic plan view of the improved conveyer apparatus, showing at one side, dipping tanks arranged beneath the track and at the opposite side, a suitable drier through which the articles are passed and dried after dipping;

Figure 2 is an elevational view, showing the general arrangement of the carriers, cams and dipping tanks;

Figure 3 is an end view of the right hand side of Figure 1 showing the elongated cam provided beneath the track for elevating and supporting the article carrying member while traveling from the loading to the unloading stations of the conveyer system, illustrated in Figure 1;

Figure 4 is an enlarged, detailed view showing a form of article-carrying member and a means provided for pivotally and movably connecting it with the trolley;

Figure 5 is a cross sectional view on the line 5—5 of Figure 4; and

Figure 6 is a detailed sectional view showing a form of holder for supporting articles of the type shown.

The novel conveyer apparatus featured in this invention comprises an endless conveyer chain or belt 11 supported beneath tracks 12 by means of a plurality of trolleys 13, as shown in Figures 4 and 5. The rails 12 are preferably of angle iron and are spaced apart to provide clearance for the lower portions of the trolleys which, it will be noted, are integrally formed with links of the chain 11. The rails 12 are suspended beneath the ceiling 14 by suitable hangers 15. The belt or chain 11 is driven from a drive sprocket 16, having a gear drive 17 connecting it with a motor 18. Sprockets 19, 21, 22 and 23 guide the chain beneath the tracks 12. The general arrangement of the chain, its supporting means and drive, is diagrammatically shown in Figure 1.

The conveyer apparatus as shown in this application is particularly adapted for use in conveying small articles such, for instance, as small hand-operated sprayers, from a loading point and through one or more dipping operations and, subsequently, through a suitable drier. It is often desirable that the handles, or portions of such sprayers, and of various other types of devices, be dipped in a suitable preserving or coating fluid, such as paint, lacquer or enamel, in order to preserve the metal, and an object of this invention is to provide a conveying apparatus which will automatically perform the above operations, after the articles have been attached to the article-carrying members or holders. To accomplish the above results, each trolley 13 has an arm or link 24 pivotally connected therewith, to the lower end of which an article-carrying member or holder 25 is pivotally connected. As all of the holders are alike in construction, but one will be described. The form of holder here shown comprises a plate having an angle iron 26 secured to the lower portion thereof to which a plurality of spring clips 27 are secured. These spring clips 27 are adapted to grip and support the barrel 28 of the sprayers, as shown in Figures 4 and 5. The horizontal web of the angle iron 26 provides a guide or stop for the ends of the sprayer barrels 28, when inserted in the clips 27. An anti-friction roller 29 is pivotally connected to the arm 24 intermediately thereof, and is adapted to engage a cam 31 for the purpose of raising or lifting the holders 25 to the elevated position shown in full and dotted lines in Figure 4. The cams 31 are secured in fixed relation to the rails or tracks 12 by means of hangers 32, and each is arranged over one end of a dipping tank. (See Figure 2.)

The dipping tanks 33 and 34 are arranged beneath one section of the track 12, as shown in Figures 1 and 2. Before dipping articles into a preserving or coating fluid, it is of course, essential that they be thoroughly cleansed, and the first tank 33 therefore preferably contains a suitable cleansing fluid such as naphtha, into which the articles are dipped before being dipped into the coating fluid, contained in the dipping tank 34. Each dipping tank has a drain board 35 adapted to catch the surplus fluid dripping from the articles when they are removed from the tanks and to return such fluid to the tanks. It will be noted that the track 12 is relatively lower at the loading and unloading stations, than it is where it passes over the dipping tanks and through the drier. (See Figure 2.) This is for the purpose of convenience in loading and unloading the article carriers or holders.

In the operation of the apparatus, the articles are attached to the holders, preferably at the point marked "loading station" in Figure 1, and, at which time the holders are in their normal suspended positions, as shown. From the loading station, the track preferably rises to a higher elevation in order to provide ample clearance below the dipping tanks 33 and 34. As each guide roller 29 engages the cam 31 positioned over the leading end of the dipping tank 33, the holder 25 will be elevated to the full line position shown in Figures 2 and 4, thereby causing the lower ends or handles 36 of the sprayers to be lifted over the end wall of the tank 33, after which the holder is lowered to its normal suspended position, resulting in the lower ends of the handles 36 being submerged in the cleansing fluid as shown in Figure 2. A second cam 37 is positioned over the drain board 35 of each dipping tank. These cams are relatively longer than the cams 31, and function to lift the articles out of the fluid in the tanks to hold them in an elevated position while passing over the drain boards 35, after which the holders are again lowered into their normal suspended positions, as shown at the left hand side of each dipping tank in Figure 2. After the articles have been dipped into and removed from the coating fluid in the tank 34, they pass through a drier 38, of suitable construction, after which they continue onward to the unloading station, shown at the upper right hand corner of Figure 1. Under ordinary conditions, when the articles arrive at the unloading station, they will be sufficiently dry to permit handling, so that they may be detached from the holders and packed for shipment or storage. The track section 39, shown at the right hand side of Figure 1 is preferably arranged at a lower level than the track sections over the dipping tanks, and the section passing through the drier, and it is also preferably on a horizontal level with the track sections at the loading and unloading stations.

An elongated guide rail or cam 41 is arranged beneath the track section 39, and is adapted to be engaged by the guide rollers 29 on the depending arms 24 to raise or lift the article holders to the positions shown in Figure 3. After the articles have been detached from the holders 25 at the unloading station, the empty holders will pass beneath the track section 39 and, as a result of the holders being elevated as shown, ample overhead clearance will be provided beneath the holders 25, while traveling from the unloading to the loading station. Before the holders reach the loading station, they will be returned to their normal suspended position, as shown at the left hand side of Figure 3, and in which position they may be readily loaded with other articles. Thus, it will be seen that after the articles have passed through the drier 38, the carriers or holders will be lowered to a position wherein the articles may be conveniently removed therefrom. The empty carriers are then lifted and carried in a raised position over the track section 39, and are again lowered to their suspended positions when they reach the loading station at the lower right hand corner of Figure 1. The cams 31, 37, and 41 co-operate with the tracks 12 to support and guide the load carriers or holders so that the suspended end portions of articles attached thereto, may be lifted over the end walls of dipping tanks, and thereafter be submerged in the dipping fluid, after which they are lifted out of the tank to continue onward over the conveyer system. The provision of the cams 31, 37, and 41 is therefore an important feature of this invention as, by their use, the carriers or holders may be intermittently raised and lowered at intervals for reasons above described, or, for the purpose of providing ample clearance below the tracks 12, from which the holders are supported.

In the drawings, I have shown the carriers or holders as being adapted to support such articles as sprayers, but it is to be understood that the holders may be designed to support other types of articles and also that the particular arrangement of the cams beneath the tracks, may be varied in numerous ways without departing from the scope of the invention.

I claim as my invention:

1. An apparatus of the class described, comprising a track, a carriage adapted to travel thereon, an arm pivotally connected with the carriage and normally depending therefrom, an article-holder connected with the lower end of said arm, opposed connected cam surfaces arranged beneath said track, and a roller on said arm intermediate its ends adapted to engage said cams to raise and lower said article-holder.

2. An apparatus of the class described, comprising a track, a carriage adapted to travel thereon, an arm pivoted at one end to said carriage, an article-holder pivotally connected to the opposite end of said arm, a dipping tank beneath said track, a cam arranged over said tank, and means on said arm adapted to engage said cam, whereby the lower end of said arm will be swung upwardly and thereby elevate the article-holder to permit articles suspended therefrom to pass over a wall of said tank.

3. An apparatus of the class described, comprising a track, a carriage adapted to travel thereon, an arm pivoted at one end to said carriage, an article-holder pivotally connected to the opposite end of said arm, a dipping tank beneath said track, cams arranged over the walls of said tank, and means on said arm adapted to engage said cams, whereby the lower end of said arm will be swung upwardly and thereby elevate the article-holder to permit articles suspended therefrom to pass over walls of said tank.

4. An apparatus of the class described, comprising a track, a carriage adapted to travel thereon, an arm pivoted at one end to said carriage, a plate pivoted to the lower end of said arm and having means thereon for detachably supporting an article, dipping tanks arranged beneath said track and spaced apart, cams over the end walls of said tanks, and means on said arm intermediate its ends adapted to successively engage said cams to cause the lower end of the arm to be swung upwardly, whereby the article suspended from said article-supporting means will be elevated to pass over said tank walls, the article being lowered as it passes over said tanks, to immerse it in the liquid contained therein.

5. An apparatus of the class described, comprising a track, a carriage adapted to travel thereon, an arm pivoted at one end to said carriage, a plate pivoted to the lower end of said arm and provided with an angle-iron having means for detachably supporting an article thereon, dipping tanks arranged beneath said track and spaced apart, opposed connected cams over the end wall of each tank, and means on said arm intermediate its ends adapted to successively engage said cams to cause the lower end of the arm to be swung upwardly, whereby the article suspended from said article-supporting means will be elevated to pass over said tank walls, the article being lowered as it passes over said tanks, to immerse it in the liquid contained therein.

6. An apparatus of the class described, comprising a track, a carriage adapted to travel thereon, an arm pivoted to the carriage and depending therefrom, an article holder connected with the arm, a dipping tank, and a cam arranged beneath said track and adapted to oscillate said arm to cause articles suspended from said holder to pass over a wall of said tank without interruption.

7. An apparatus of the class described, comprising a track, a carriage adapted to travel thereon, an arm pivoted to said carriage and provided with an article holder, a dipping tank beneath said track, and a cam member arranged over said tank and adapted to oscillate said arm to cause articles suspended from said holder to pass over a wall of said tank.

8. An apparatus of the class described, comprising a track, a carriage adapted to travel thereon, an arm attached to the carriage and having an article holder normally positioned to suspend an article at elevation below said carriage, a lifting means for the arm, means situated on said arm intermediate its ends adapted to engage said lifting means and cause said arm to be elevated whereby the article holder will be gradually moved upwardly in a direction opposite to the travel of the carriage, and means for permitting gradual lowering of said arm from elevated position, to return the article holder to its normal position.

9. An apparatus of the class described, comprising a track, a carriage adapted to travel thereon, an arm movably attached to the carriage and having an article holder normally positioned to suspend an article at elevation below the carriage, a relatively fixed lifting member, means situated on said arm intermediate its ends adapted to engage said lifting member and cause said arm to be elevated, whereby the article holder will be gradually moved upwardly, and means for permitting gradual lowering of said arm from elevated position, to return the article holder to its normal position.

In witness whereof, I have hereunto set my hand this 5th day of April, 1927.

MARTIN J. ANDERSON.